W. JOHNSON.
BAIL FOR POTS AND KETTLES.
APPLICATION FILED OCT. 25, 1909.
1,026,093.
Patented May 14, 1912.
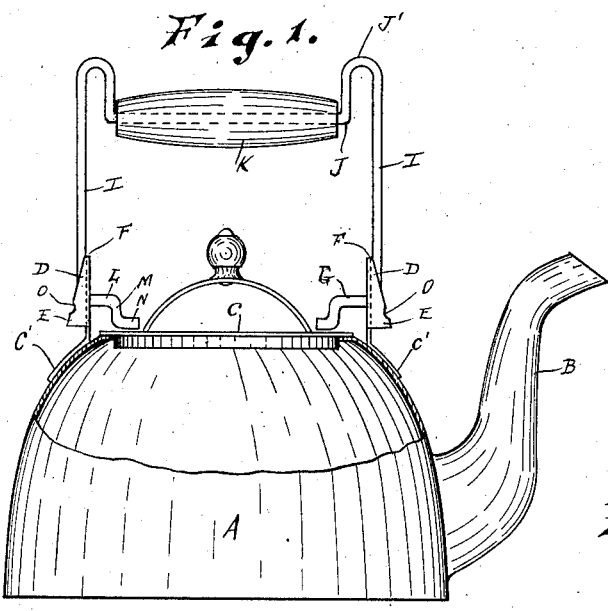
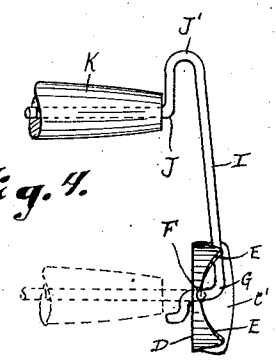
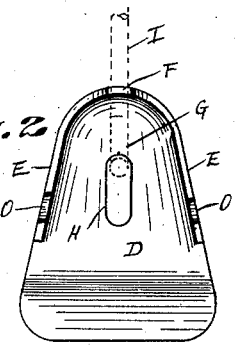
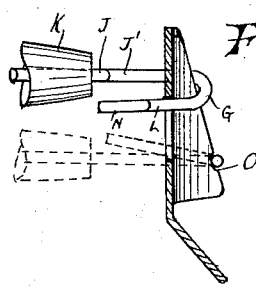
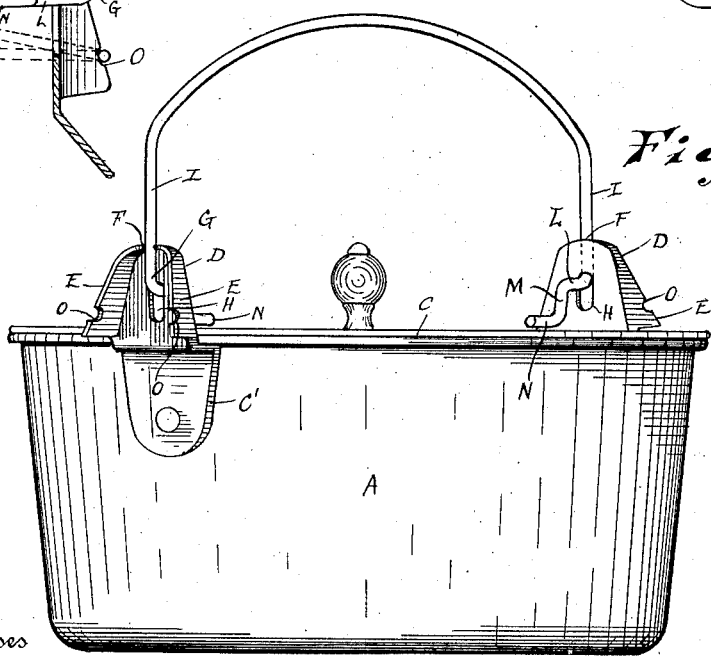

UNITED STATES PATENT OFFICE.

WALFRED JOHNSON, OF MILWAUKEE, WISCONSIN.

BAIL FOR POTS AND KETTLES.

1,026,093.  Specification of Letters Patent.  Patented May 14, 1912.

Application filed October 25, 1909. Serial No. 524,308.

*To all whom it may concern:*

Be it known that I, WALFRED JOHNSON, a citizen of the United States, residing at Milwaukee, county of Milwaukee, and State of Wisconsin, have invented new and useful Improvements in Bails for Pots and Kettles, of which the following is a specification.

My invention relates to improvements in bails for pots and kettles.

The object of my invention is to provide a form of bail, which will automatically assume and normally retain a raised position, and which will preferably hold a cover in position when the bail is in such raised position, the handle being thereby kept cool and the cover prevented from falling off and scalding the hands of the user when pouring liquids from the vessel.

In the following description, reference is had to the accompanying drawings in which, Figure 1 is a side view of a kettle embodying my invention. Fig. 2 is a detail view of one of the bail retaining ears as seen from its outer face. Fig. 3 is a detail side view of the same, showing a portion of the bail depressed and with dotted lines indicating its position, when locked in depressed position. Fig. 4 is a plan view of the ear and a portion of the bail, showing the latter in depressed position, with dotted lines indicating its raised position. Fig. 5 is a side view of a pot or stew pan embodying my invention.

Like parts are identified by the same reference characters throughout the several views.

The kettle A is provided with an ordinary spout B and a cover C, which may also be of ordinary construction. The bail retaining ears are each provided with a portion C', which is soldered or riveted to the kettle, and a raised portion D which tapers to a rounded upper end, and is provided with outwardly projecting ribs or side flanges E, which increase in width from a centrally disposed notch F to their lower ends.

The bail is formed of resilient material (preferably wire) and comprises portions G, which extend inwardly through apertures H in the respective ears, and upwardly extending arms I connected at or near their upper ends by a handle-receiving portion J, having a handle K. This bail is also provided with end portions L, which offset downwardly at M and inwardly at N, with slightly upturned extremities whereby the extremities are kept from scratching the cover. The portions N will be in close proximity to and above the cover margins when the handle is in normal raised position, and are thus adapted to hold the cover in place.

The bail is so formed that the arms I will press inwardly and bear resiliently against the outer surfaces of the ears. To allow freedom of movement, the upper ends of these arms are preferably looped as shown at J'. When the handle is swung downwardly, the pressure of these arms I upon the inclined side flanges E, causes these arms to move upwardly as soon as the bail is relieved of downward pressure, the bail being thus forced to a raised position. By providing the ears with flanges E on both sides, the bail may be swung in either direction and automatically returned to a raised position as soon as released. If desired, however, one or more of the flanges E may be provided with a notch O, in which the bail may be entered and held in a depressed position. This notch, if used, will preferably be located below the normal position of the bail when depressed. The holes H in the ears may be elongated sufficiently to permit a further depression of the parts G of the bail, by manual pressure sufficient to engage the arm I in a notch O. By elongating these holes H, there will also be a tendency for the side of the bail, farthest from the pouring side, to move downwardly in the hole during a pouring operation, thus causing the portion N on this side to bear forcibly upon the margin of the cover on this side, and prevent the escape of steam at a point where it might otherwise scald the hands of the user. When the bail is depressed, the parts G will be retracted by the pressure of the flanges E on the arms I, sufficiently to withdraw the parts N from the cover and permit its removal. Owing to the downward offsets M, the parts N will also be raised when retracted by the depression of the handle toward either side.

It is of great importance that the end portions of the bail extend through the pivot apertures in the ears from the outer side, since with this construction, the depression of the bail retracts the cover-retaining extremities and permits a removal of the cover. Another advantage secured by having the bail ends engage the ears from the outer side is that the side flanges E of the ears will in this construction, project outwardly and will therefore not interfere with the removal and replacement of the cover, and the ears may be located in close proximity to the cover.

Referring to Fig. 5, it will be observed that my invention may be easily applied to a stew pan, or any other receptacle, the only difference being in the attachment of the ears. It will, of course, be understood that while I have shown the ears on both sides, as provided with flanges E, it is not essential that more than one of the ears should be other than of ordinary construction.

Having thus described my invention, what I claim as new, and desire to secure by Letters Patent is,—

1. In a device of the described class, the combination with a receptacle, of a bail, having resilient arms, provided with inwardly extending pivotal extensions at their lower ends, and a set of retaining ears apertured and receiving said pivotal extensions, and provided with ribs outwardly projecting at the sides of said apertures, tapering upwardly, inwardly and convergingly and terminating in centrally disposed notches above the apertures, said apertures being elongated, and one of said ribs having a notch adapted to receive a bail arm when swung downwardly to an extreme position and depressed in its pivot aperture; said notch being below the normal position of the bail when swung downwardly.

2. In a device of the described class, the combination with a receptacle, of a bail, having resilient arms, provided with inwardly extending pivotal extensions at their lower ends, and a set of retaining ears apertured and receiving said pivotal extensions, and provided with ribs outwardly projecting at the sides of said apertures, tapering upwardly, inwardly and convergingly and terminating in centrally disposed notches above the apertures, said pivotal extensions having inner ends, normally in cover-retaining position, and of a length to be retracted from such position when the bail is depressed and the arms are spread by said ribs.

In testimony whereof I affix my signature in the presence of two witnesses.

WALFRED JOHNSON.

Witnesses:
LEVERETT C. WHEELER,
I. D. BREMER.

---

Copies of this patent may be obtained for five cents each, by addressing the "Commissioner of Patents, Washington, D. C."